Patented Apr. 4, 1939

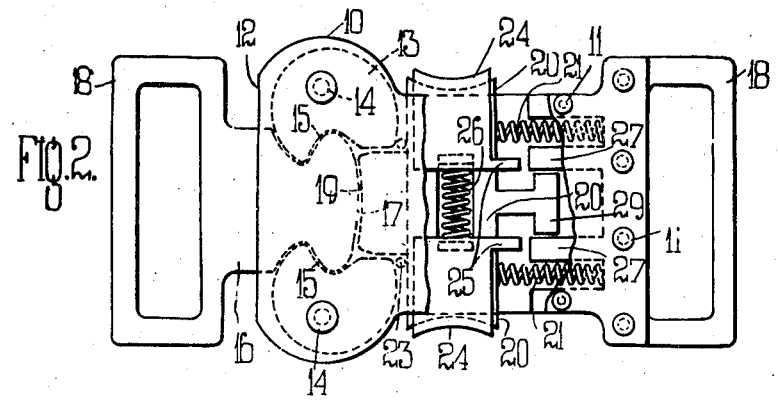
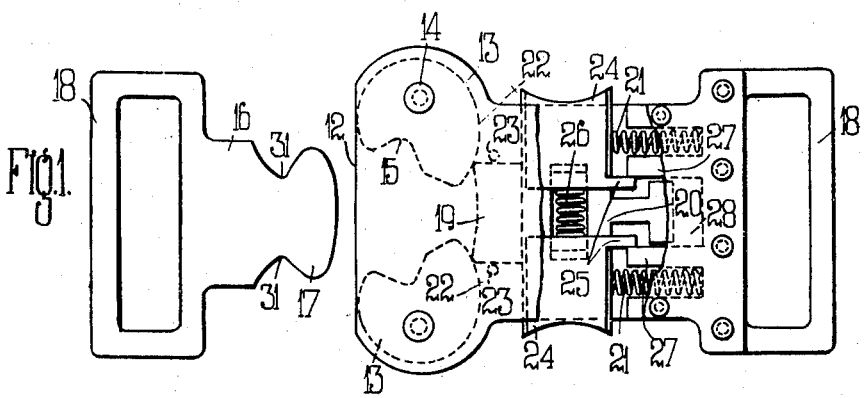
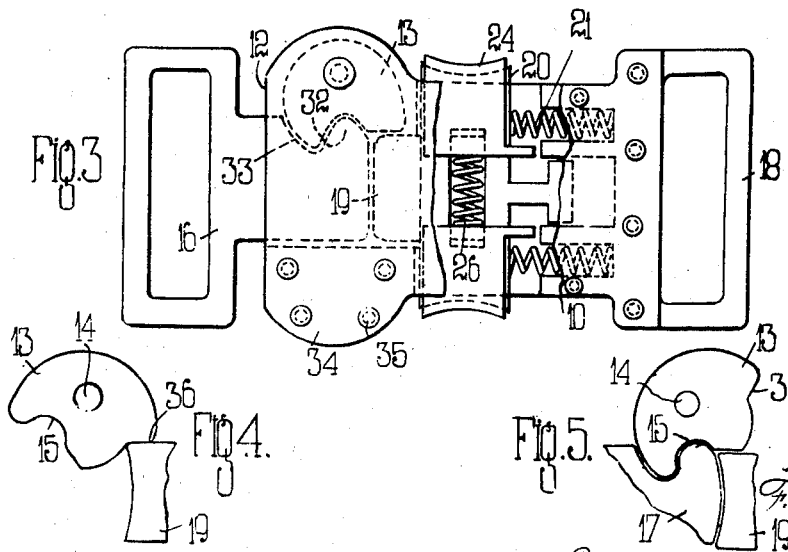

2,153,077

UNITED STATES PATENT OFFICE 2,153,077

COUPLING

Frederick Arthur Clarke, Chelsfield, England

Application July 21, 1937, Serial No. 154,905
In Great Britain May 24, 1937

8 Claims. (Cl. 24—230)

The present invention relates to couplings, and has for its object the provision of means for rendering the coupling automatic in action on bringing the elements thereof into engagement and which maintains the connection between the elements with reasonable certainty against possibility of accidental or inadvertent separation.

The invention is more particularly described with reference to the accompanying drawing, in which:—

Figure 1 is a view of the members of the coupling prior to inter-engagement and with a pair of spaced pivotal fingers of the socket member held in their open position by the resiliently loaded longitudinal element for the reception of the male member.

Figure 2 is a corresponding view but with the members of the coupling in their locked position.

Figure 3 is a view corresponding to Fig. 2 but of a modified form of construction in which one pivotal finger only is provided and the male member is asymmetrical longitudinally.

Figure 4 is a modified view of a finger suitable for use with either of the constructions shown in Figures 1–3, this figure showing the relationship between the finger and the longitudinally displaceable element in the unlocked position of the coupling.

Figure 5 is another view of the modification of Figure 4, but showing the relative positions of the finger and the longitudinally displaceable element in the locked position of the coupling.

In the drawing, a coupling of the relatively flat type is illustrated, and with particular reference to Figures 1 and 2, the socket member 10 comprises front and rear plates rigidly held together in spaced relationship by rivets 11 to form a relatively flat hollow shell or casing in the aperture at the end 12 of which a pair of fingers 13 are pivotally mounted at 14 to the front and rear plates. The fingers 13 are of similar shape but are of opposed relationship, the inner edges of the fingers being recessed at 15 so that when in the position shown in Figure 1 they present a maximum width of opening for the reception of the male member 16 of the coupling which has an enlarged head 17.

Both coupling members 10 and 16 in the form illustrated in the drawing have an eyelet 18 at their rear ends for the reception of the ends of a belt, for example, in which case the coupling is suitable for use as a belt fastener.

In the unlocked position of the coupling, that is to say, with the members 10 and 16 separated, the fingers 13 are maintained in the position shown in Fig. 1 by an abutment 19 at one end of a plate 20 which is adapted to slide longitudinally within the casing, formed by the front and rear plates, under a resilient control constituted by springs 21. The action of the springs is to force the plate 20 and its abutment 19 towards the aperture 12 of the socket member. The abutment 19 is normally maintained in contact with the curved outer edges 22 of the fingers by said springs 21 and this operates to maintain the fingers in their open position as the tendency of the abutment 19 is to move the upper finger in a clockwise direction and the lower finger anticlockwise.

Stops 23 are provided between the front and rear walls of the casing to limit the movement of the plate 20 in its displacement towards the aperture 12. The plate carries a pair of transverse slides 24 which are provided with rear longitudinal projections 25 on their inner edges, said slides being normally held apart by a spring 26. The rear end of the casing has laterally spaced stationary projections 27 with a recess 28 between them.

As will be seen from a glance at Figures 1 and 2, the projections 25 of the transverse slides 24 lie within the recesses 28 when the coupling members are separated, that is to say, the slides are maintained in their inner position relatively to the plate 20 by the projections 27 which prevent the projections 25 from moving transversely outwardly of the longitudinal axis of symmetry of the socket member, and thus nullify the action of the spring 26.

When, however, the elements of the coupling are in their closed position and the plate 20, the abutment 19 carried thereby, and the transverse slides 24 are moved bodily as a unit towards the aperture 12 of the socket member under the control of the springs 21, the projections 25 are clear of the projections 27 with the result that the spring 26 operates to force the slides transversely apart. The plate 20 may be guided for longitudinal displacement within the casing by external flanges on the longitudinal edges of the plate which are adapted for engagement with the outer longitudinal edges of the socket member but preferably the guide for the longitudinal displacement of the plate 20 is constituted by an internal cross head 29 at one end of the plate which at all times lies within the recess 28.

The head 17 of the male member 16 preferably is formed by providing recesses 31 in rear of its leading end so that when the male member is in its locked position within the socket member the longitudinal side edges of the male member 16 in the region of the head 17 are complementary to the recesses 15 in the fingers 13.

For the purpose of locking the coupling members 16, 10 the member 16 is moved towards the member 10 and the head 17 inserted within the aperture 12 until the leading end of the head 17 enters the recesses 15 and angularly displaces the upper finger in an anticlockwise direction and the lower finger in a clockwise direction about their pivots 14. This displacement causes a movement of the abutment 19 the plate 20 and the transverse slides 24 as a unit towards the right of Figure 1 against the action of the springs 21 until the fingers have been angularly displaced to reach the position shown in Fig. 2, whereupon the rear ends of the fingers are separated by an amount sufficient to allow the abutment 19 to advance under the action of the springs 21 so that this automatically is displaced into the position shown in Fig. 2, whereupon the fingers cannot rotate in the reverse direction and the parts are locked.

Simultaneously with this displacement of the abutment 19 the spring 26 forces the slides 24 transversely outwardly to bring the projections 25 in line with the projections 27 so that the abutment 19 cannot return to the position shown in Fig. 1 until the slides 24 under the application of a manual or other force are moved transversely inwardly against the action of the spring 26 and the slide as a whole is moved longitudinally of the casing rearwardly of its aperture to bring the (rear) projections 25 within the recess between the projections 27.

It will thus be seen that in the position shown in Fig. 2 the members 16, 16 of the coupling are effectively locked until such time as the slides 24 are depressed inwardly and the plate carrying the slides is moved rearwardly of the aperture.

In a modified form of construction, the head of the member 16 may be asymmetrical as shown in Fig. 3, that is to say it may be straight along one longitudinal edge and have a projection 32 in advance of a recess 33 along its opposite longitudinal edge. In such an event one pivotal finger 13 only is required, the opposite side of the aperture 12 being taken up by a distance piece 34 which is immovable and is held between the front and rear plates by rivets 35. Otherwise the construction is the same as in Figs. 1 and 2.

Again, if desired, the fingers may take the shape shown in Figures 4 and 5, that is to say, in addition to the recesses 15 they may also be provided with shoulders 36 which are engaged by the abutment 19 when the coupling members 10, 16 are separated. In this respect, Fig. 4 shows the relative position of a finger and its abutment 19 when the parts are in the unlocked or separated position similar to that of Fig. 1, whilst Figure 5 shows the relative position of a finger and the abutment 19 in that position corresponding to Fig. 2 in which the parts are interlocked.

If desired, the socket member 10 and the male member 16, instead of being of relatively flat form, may be circular or other section and more than two fingers may be employed.

It will be appreciated that the action is of the snap type in that the act of insertion of the male member enables the plate 20 to be gradually forced rearwardly by the rotation of the pivotal fingers until the rear ends of these are rapidly apart by a sufficient amount to allow of the rapid forward movement of the plate under its resilient load created by the spring 21, said movement taking place instantaneously with the limit of forward movement of the head 17 of the male member within the recesses 15 between the fingers. In other words, no operation other than the insertion of the male member is required to effect locking of the coupling members.

It will also be appreciated that the operation of the coupling of the present invention is such that no operation by way of manual adjustment of any of the parts is necessary to bring these back into a position in which the socket member 10 is capable of receiving the male member 16, i. e. locking is effected automatically with insertion of the male member and, after unlocking has been effected by transverse depression of the slide members 24 accompanied by longitudinal retraction of the plate 20, the parts are ready automatically, without further adjustment, for the next coupling operation.

The coupling of the present invention may be used for many widely different purposes, such as for example, dog lead and collar connections, detachably connecting ships furniture to decks, the coupling of rail or road vehicles, the coupling of bombs to bomb carrying and release means from aircraft, or again for safety straps for parachute harness. As other examples reference may be made to its use in association with a support for collapsible bunks, motor car bonnets, and life belts, or again as a door lock.

It is to be clearly understood that minor changes in the details of construction and arrangement of parts may be made without departing from the scope of the invention as set forth in the appended claims.

I declare that what I claim is:—

1. A coupling including a pair of parts adapted to be coupled together, one of said parts having a head provided with opposed recesses, and the other of said parts including a socket member having an open end, a pair of latch fingers pivoted at opposite sides of the open end of said socket member for engaging the walls of opposed recesses in said head when the parts are coupled together, a longitudinally shiftable plate mounted centrally in said socket member and having an abutment at the forward end thereof, a pair of spaced springs bearing against said socket member and the opposite end of said plate for normally forcing said plate and the abutment toward the open end of said socket member, said abutment being adapted to extend between adjacent ends of said latch fingers when the opposite ends thereof are in engagement with the walls of the recesses in said head whereby to lock the said fingers in the said recesses, a pair of opposed members carried by said plate and movable therewith, said members being shiftable in a plane normal to the direction of movement of said plate, spring means for normally maintaining said shiftable members separated, a pair of projections on said socket member between said pair of springs and defining a space, a pair of rearwardly extending projections one on each of said shiftable members for abutting against the projections on said socket member when the coupling parts are locked together whereby to prevent accidental displacement thereof, the projections on said shiftable members adapted to extend into the space between the projections on said socket member when the shiftable members are shifted inwardly toward one another to permit the plate to be retracted and the latch fingers to release the head.

2. A coupling including a pair of parts adapted to be coupled together, one of said parts having a recessed head, and the other of said parts including a socket member having a latch finger pivoted therein for engaging the wall of the recess in said head when the parts are coupled together, the part including said socket member carrying locking means shiftable longitudinally toward said socket member for engaging said latch finger and for maintaining the said finger in engagement with the wall of the recess in said head, spring means for normally forcing said locking means toward a locking position, and means including a resiliently loaded member located in said socket member and shiftable transversely of the axis of displacement of said locking means, said resiliently loaded member being engageable with said locking means and being shiftable from a position in engagement with an adjacent part of said socket member for preventing displacement of said locking means from a locked position inwardly to a position out of engagement with the adjacent part of said socket member for permitting longitudinal displacement of the locking means to an unlocked position.

3. A coupling including a pair of parts adapted to be coupled together, one of said parts having a recessed head, and the other of said parts including a socket having a latch finger pivoted therein for engaging the wall of the recess in said head when the parts are coupled together, a plate carried by the part which includes the socket, said plate being shiftable longitudinally of said part toward and away from said socket for engaging and disengaging said latch finger, spring means normally forcing said plate toward said socket for maintaining said latch finger in engagement with the wall of the recess in said head, and a resiliently loaded member carried by said plate and shiftable transversely thereof and adapted to cooperate with the associated part of said coupling for preventing accidental movement of the plate from advanced locking position and for permitting retraction of said plate when shifted inwardly thereof.

4. A coupling including a pair of parts adapted to be coupled together, one of said parts having a recessed head, and the other of said parts including a socket having a latch finger pivoted therein for engaging the wall of the recess in said head when the parts are coupled together, a plate shiftable longitudinally of the coupling part which includes the socket and having an abutment member, said plate and the abutment thereon being shiftable toward said socket for engagement with said latch finger, spring means normally forcing said plate toward said socket for maintaining said abutment member in engagement with said latch finger whereby to lock the said latch finger in engagement with the wall of the recess in said head, and a resiliently loaded member carried by said plate and shiftable transversely thereof and adapted for cooperation with the associated coupling part for preventing accidental movement of the plate from advanced locking position and for permitting retraction of the plate when shifted inwardly thereof.

5. A coupling, as claimed in claim 4, wherein the abutment and the adjacent end of the latch finger are provided with flat abutting surfaces when in engagement for locking the opposite end of the latch finger in the recess in the head.

6. A coupling, as claimed in claim 4, wherein the head is provided with an opposed recess and wherein the socket has an additional latch finger adapted to engage the wall of the opposed recess in said head, and wherein the abutment member is shiftable between the said latch fingers for maintaining the same in locking engagement with the walls of the recesses in said head.

7. A coupling including a pair of parts adapted to be coupled together, one of said parts having a head provided with opposed recesses, and the other of said parts including a socket member having a pair of latch fingers pivoted therein for engaging the walls of the recesses in said head when the parts are coupled together, a plate carried by the coupling part which includes the socket member, said plate being shiftable longitudinally of said coupling part toward and away from said socket member for engaging and disengaging said latch fingers, spring means normally forcing said plate toward said socket member for engaging between said latch fingers whereby to maintain the said latch fingers in engagement with the walls of the recesses in said head, and a resiliently loaded member carried by said plate and shiftable transversely thereof and including projections engageable with portions of the associated coupling part for preventing accidental movement of the plate from advanced locking position, said resiliently loaded member being shiftable out of engagement with the associated coupling part for permitting retraction of said plate when shifted inwardly thereof.

8. A coupling including a pair of parts adapted to be coupled together, one of said parts having a head provided with opposed recesses, and the other of said parts including a socket member having an open end, a pair of latch fingers pivoted at opposite sides of the open end of said socket member for engaging the walls of the opposed recesses in said head when the parts are coupled together, a plate carried by the coupling part which includes the socket member, said plate being shiftable longitudinally of said coupling part toward and away from the open end of said socket member for engaging and disengaging said latch fingers, spring means normally forcing said plate toward the open end of said socket member and between the said latch fingers for maintaining said fingers in engagement with the walls of the opposed recesses in said head, a pair of spaced projections on the coupling part which includes the socket member, said spaced projections being disposed in the rear of the open end of said socket member, a pair of opposed members shiftable transversely of said plate and movable therewith, resilient means for normally maintaining said transversely shiftable members separated, each of said transversely shiftable members having a projection adapted to abut against one of the said spaced projections when said transversely shiftable members are separated for preventing accidental movement of said plate from locking position, said transversely shiftable members being shiftable inwardly of said plate to permit the projections thereon to pass the said spaced projections whereby to permit withdrawal of said plate from locking position.

FREDERICK ARTHUR CLARKE.